United States Patent [19]

Kuriyama et al.

[11] Patent Number: 5,075,940
[45] Date of Patent: Dec. 31, 1991

[54] PROCESS FOR PRODUCING SOLID ELECTROLYTIC CAPACITORS

[75] Inventors: Chojiro Kuriyama, Kyoto; Tatsuhiko Oshima, Kasaoka; Miki Hasegawa, Kyoto, all of Japan

[73] Assignee: Rohm Co., Ltd., Kyoto, Japan

[21] Appl. No.: 302,022

[22] Filed: Mar. 19, 1991

[30] Foreign Application Priority Data

Apr. 6, 1990 [JP] Japan .................................. 2-92498

[51] Int. Cl.$^5$ ........................ H01G 5/38; H01G 9/05
[52] U.S. Cl. ................................ 29/25.03; 361/529; 361/541; 437/919; 437/205; 148/DIG. 14
[58] Field of Search ............... 29/25.03; 361/540, 529, 361/525, 527, 532, 534, 328, 541, 311; 437/919, DIG. 14, 221, 205

[56] References Cited

U.S. PATENT DOCUMENTS

| | | | |
|---|---|---|---|
| 2,987,800 | 6/1961 | Kurland et al. | 29/25.03 |
| 3,403,303 | 9/1968 | Klein | 29/25.03 |
| 3,412,444 | 11/1968 | Klein | 361/529 |
| 3,424,952 | 1/1969 | Vierow | 361/529 |
| 4,417,298 | 11/1983 | Nakata et al. | 361/540 |
| 4,881,149 | 11/1989 | Tokura et al. | 361/328 |
| 4,945,452 | 7/1990 | Sturmer et al. | 29/25.03 |

Primary Examiner—Brian E. Hearn
Assistant Examiner—Michael Trinh
Attorney, Agent, or Firm—William H. Eilberg

[57] ABSTRACT

The present invention provides a process which is particularly suited for mass-producing solid electrolytic capacitors. The process utilizes a combination of a mold and a presser member. The mold has a series of molding recesses, and a lead receiving groove extending along and through the series of molding recesses. The presser member has a corresponding series of pressing projections. A portion of a continuous lead wire is placed in the groove, and powdered electrode material is loaded in the molding recesses. The presser member is then moved toward the mold, so that the powdered material is compacted within the molding recesses by the pressing projections. The resulting compacts are removed from the mold together with the wire. The same process steps are repeated with respect to other portions of the wire.

8 Claims, 3 Drawing Sheets

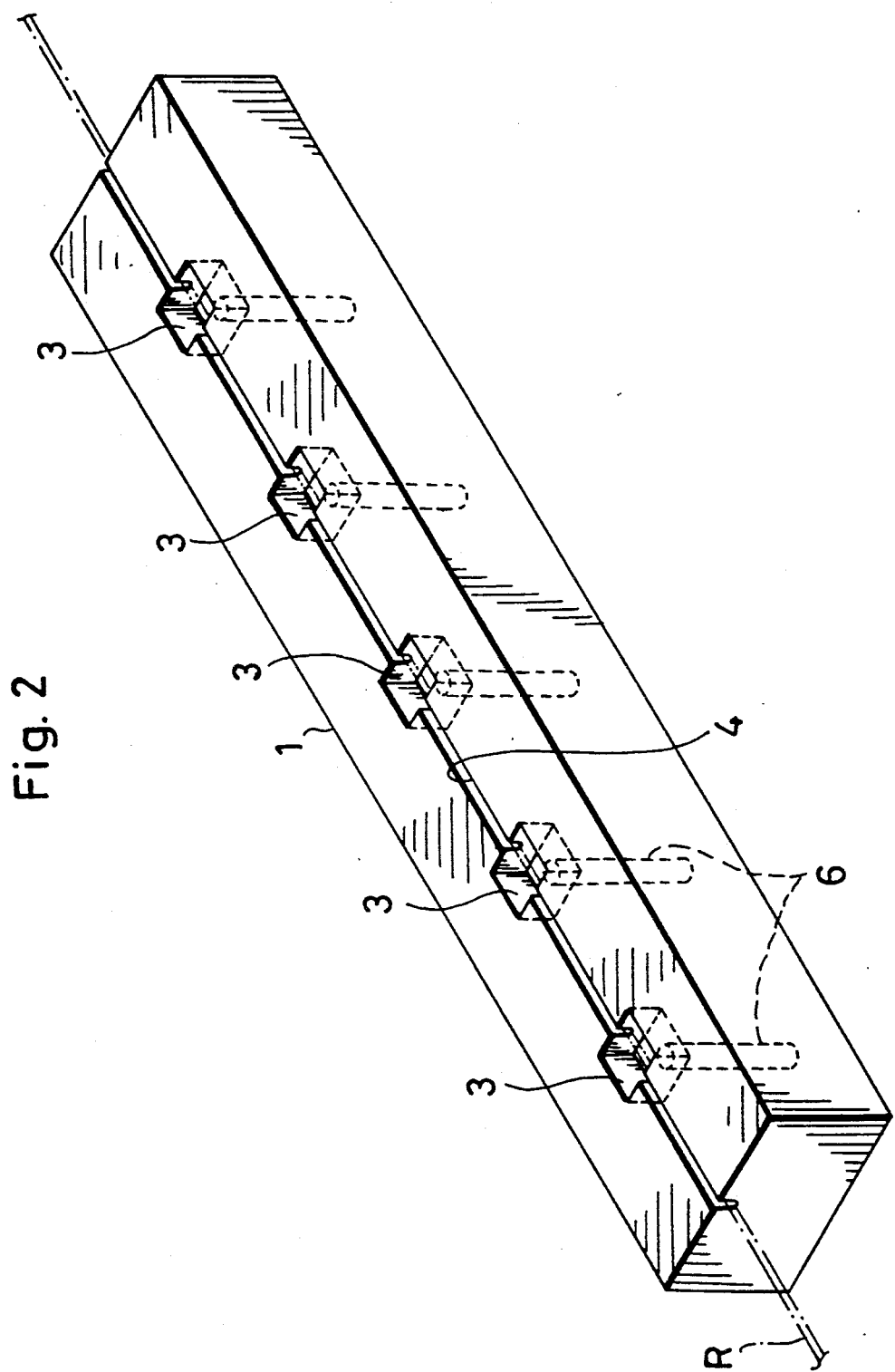

PROCESS FOR PRODUCING SOLID ELECTROLYTIC CAPACITORS

BACKGROUND OF THE INVENTION

1. Field of the Invention

This invention relates generally to a process for producing capacitors. More particularly, the present invention relates to a process for producing solid electrolytic capacitors of the type which comprises a lead wire partially embedded in and partially projecting from a compacted mass of powdered electrode material such as tantalum powder.

2. Description of the Prior Art

As is well known, capacitors have the function of storing and discharging electrical energy, and are widely used in designing electronic and electronical circuits. Obviously, the capacitor should preferably be small-sized but yet have a large capacity. One typical example meeting such requirements is the solid electrolytic capacitor.

The solid electrolytic capacitor is a polar capacitor which includes a metallic anode (positive electrode) and a solid electrolyte cathode (negative electrode). The surface of the metallic anode is oxidized to form an oxide layer acting as a dielectric substance separating electrically between the anode and the cathode. Most commonly used for the metallic anode is a compacted mass of tantalum powder.

To specifically explain the problems to be solved by the present invention, reference is now made to FIG. 5 schematically showing a typical prior art process for producing a solid electrolytic capacitor which incorporates a tantalum electrode. As shown in FIG. 5, tantalum powder 11 is first loaded into a molding recess 10a of a mold 10, and a short lead wire 12 is inserted into the load of tantalum powder. Then, the load of tantalum powder is compacted by a presser rod 13. The resulting compact 11' is removed from the mold. Obviously, the compact 11' is highly porous and therefore has a large surface area (including the internal pore surface area) which increases the capacity of the resulting capacitor.

The compact 11' of tantalum powder thus obtained is sintered in a vacuum sintering furnace (not shown). Thereafter, the compact is dipped in a chemical solution bath (not shown) and electrolytically oxidized to form an oxide coating or layer ($Ta_2O_5$) which is a dielectric substance. The electrolytic oxidation occurs within the pores of the compact according to the following reaction.

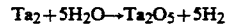

$$Ta_2 + 5H_2O \rightarrow Ta_2O_5 + 5H_2$$

After the chemical treatment described above, the compact is impregnated with a solution of manganese nitrate ($Mn(NO_3)_2$) which is thermally decomposed to form a layer of manganese dioxide ($MnO_2$) which is a solid electrolyte substance. The manganese dioxide layer acts as a first cathode layer.

Then, the compact is subjected to a graphitizing treatment and a silver coating treatment to form second and third cathode layers on the manganese oxide layer. A capacitor element is thus obtained.

Finally, the capacitor element is formed into a final product by undergoing aftertreatments which include a soldering step, and encasing step, a marking step, and etc.

The prior art process described above is disadvantageous in the following respects.

First, according to the prior art process, only a single compact is obtained by a single compacting step, so that the production efficiency is very low. It is conceivable to improve the production efficiency by using a plurality of molds for simultaneously producing a corresponding number of compacts at a time. In this case, however, it is still necessary to separately prepare a corresponding number of short lead wires and introduce them in the respective molds in addition to separately loading the molds with tantalum powder, consequently failing to provide a reasonable increase of the productivity.

Second, tantalum powder is compacted by applying a pressing force axially of the lead wire 12. Thus, during the compacting step, the portion of the lead wire inserted in the load of tantalum powder may be subjected to buckling which may deteriorate the quality of the product. This problem is particularly serious when the lead wire is very thin, but the lead wire should be as thin as possible to realize miniaturization of the capacitor. Indeed, the prior art process is applicable only to lead wires of no less than 180 μm in diameter.

SUMMARY OF THE INVENTION

It is, therefore, an object of the present invention to provide a process by which solid electrolytic capacitors are efficiently produced without quality deterioration.

Another object of the present invention is to enable the use of very thin lead wires in producing solid electrolytic capacitors.

A further object of the present invention to enable continual production of solid electrolytic capacitors.

According to the present invention, there is provided a process for producing solid electrolytic capacitors by using a combination of a mold and a presser member, wherein the mold is formed with at least one series of molding recesses, the mold further being formed with a lead receiving groove extending along said at least one series of molding recesses to pass through the respective molding recesses, the depth of the lead receiving groove being smaller than that of each molding recess, the presser member being formed with a series of pressing portions in corresponding relation to said at least one series of molding recesses, the process comprising the steps of:

(a) placing a lead wire in the lead receiving groove, the lead wire having at least a length substantially corresponding to that of the lead receiving groove;

(b) loading the respective molding recesses with powdered electrode material;

(c) causing the respective pressing portions to press the powdered material for compacting thereof within the respective molding recesses; and (d) removing the resulting compacts of powdered material from the mold together with the lead wire.

Other objects, features and advantages of the present invention will be fully understood from the following detailed description given with reference to the accompanying drawings.

BRIEF DESCRIPTION OF THE DRAWINGS

In the accompanying drawings:

FIG. 2 is a perspective view showing a mold suitably used for performing the process of the present invention;

DETAILED DESCRIPTION OF THE PREFERRED EMBODIMENTS

Figure 1A:
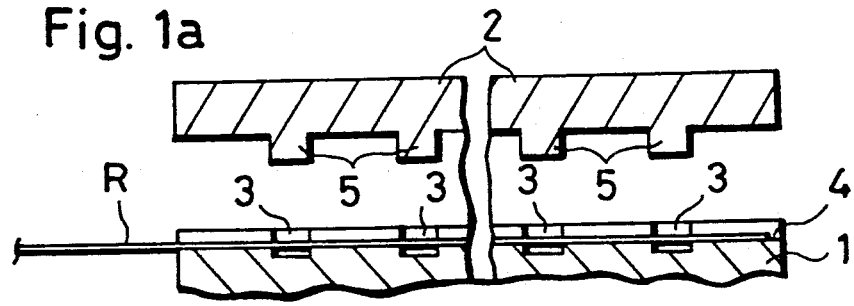
FIGS. 1a through 1e are sectional front views illustrating the successive steps of a process according to the present invention.

Referring now to FIGS. 1a through 1e and 2, there is shown a combination of a mold 1 and a presser member 2 for use in performing the process according to the present invention. The mold 1 is fixedly supported on a stationary part of a press machine (not shown) for example, whereas the presser member 2 is mounted on a movable part of the press machine to move vertically relative to the mold 1.

As clearly shown in FIG. 2, the mold 1 is elongate according to the illustrated embodiment. The upper side of the mold 1 is formed with a straight series of molding recesses 3 arranged at constant spacing longitudinally of the mold. Further, the mold upper side is also formed with a straight lead receiving groove 4 extending longitudinally of the mold to pass or traverse through the respective recesses 3. The depth of the lead receiving groove 4 is smaller than, but preferably slightly larger than half, that of each molding recess 3 (see FIG. 2).

According to the illustrated embodiment, each molding recess 3 has the shape of a rectangular parallelepiped. However, the molding recess may have any optional shape depending on the capacitor requirements.

The presser member 2 may be elongate similarly to the mold 1, and is arranged above the mold. The underside of the presser member is formed with a longitudinal series of pressing projections 5 in corresponding relation to the respective molding recesses 3 of the mold.

Using the mold 1 and the presser member 2, the process according to the present invention is performed in the following manner to manufacture solid electrolytic capacitors.

First, with the presser member 2 raised, a lead wire R is introduced into the longitudinal groove 4 of the mold 1, as shown in FIG. 1a. Preferably, the lead wire R is supplied continually from a reel (not shown) without cutting even after setting relative to the mold. The lead wire may be made of tantalum for example.

Figure 4:
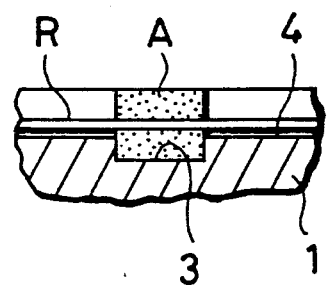
FIG. 4 is a fragmentary sectional view showing a material-loading step of the process.
Figure 5:
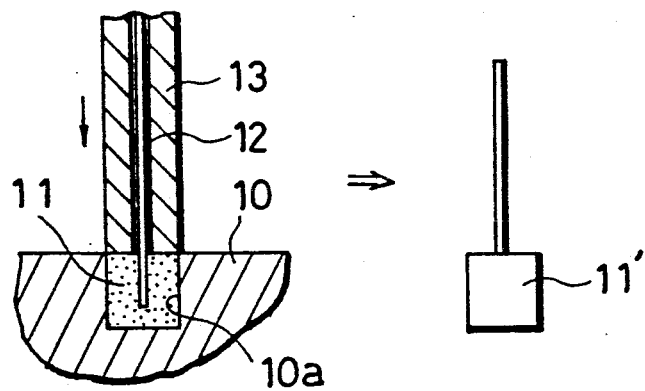
FIG. 5 is a view showing a typical prior art process.

It should be appreciated that, for the convenience of illustration, the lead wire R is shown in FIG. 1a as placed in direct contact with the bottom of the longitudinal groove 4. In reality, however, the lead wire is initially held slightly above the groove bottom, as clearly shown in FIG. 4. Due to such an initial setting, the lead wire comes into contact with the groove bottom only upon subsequent application of a pressing force. In this way, the lead wire is prevented from being subjected to a shearing force at the time of compacting.

Figure 1B:
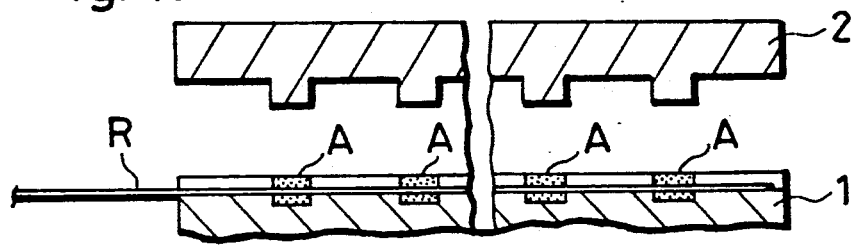

After setting of the lead wire R, powdered electrode material A (positive electrode material) is loaded into the respective molding recesses 3 of the mold 1, as shown in FIG. 1b. As a result, the lead wire penetrates through each load of electrode material. A typical example of powdered electrode material is tantalum powder.

Figure 1C:
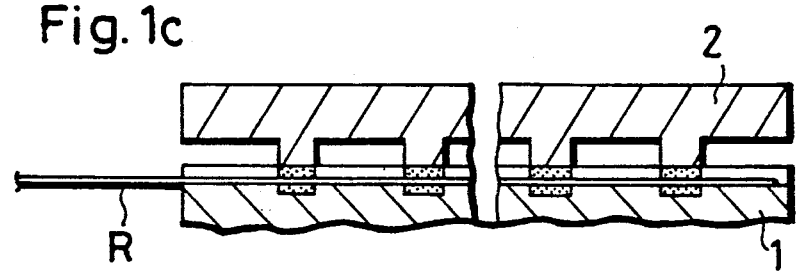

After loading of the electrode material A, the presser member 2 is lowered, so that the electrode material is compacted by the pressing projections 5 within the respective recesses 3, as shown in FIG. 1c. At this time, the lead wire R is slightly depressed to come substantially into contact with the recess bottom, but no shearing of the lead wire occurs, as described above.

Figure 1D:
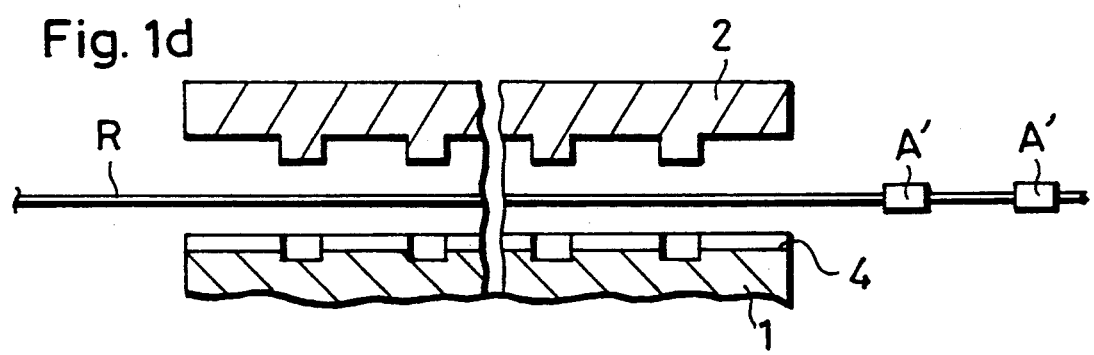

Then, the presser member 2 is raised to open the mold 1, as shown in FIG. 1d. Thereafter, the lead wire R is lifted up together with the formed compacts A' by a feed device (not shown) having a lift-up function, and advanced for a predetermined distance. To assist removal of the compacts A' from the molding recesses 3, use may be made of pusher pins 6 (see FIG. 2) which are arranged in corresponding relation to the molding recesses to push up the compacts in timed relation to lifting up of the lead wire R.

Figure 1E:
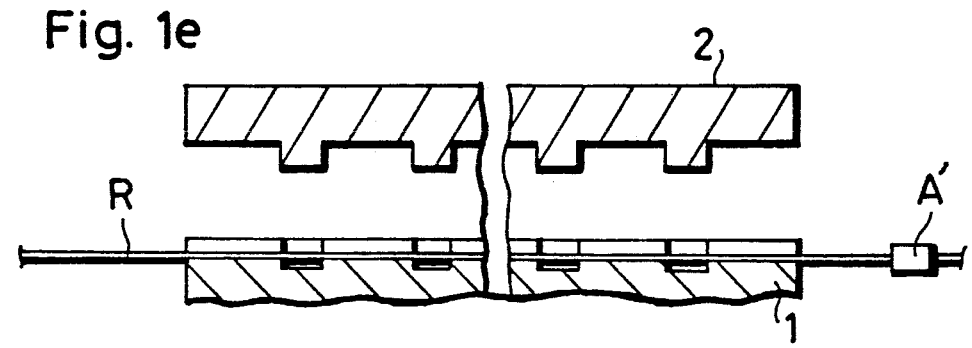

The lead wire R thus lifted up and advanced is lowered again to introduce a new portion of the lead wire into the lead receiving groove 4 of the mold 1, as shown in FIG. 1e. The process steps shown in FIGS. 1a through 1e may be repeated continually to efficiently provide a number of compacts A'.

Figure 3:
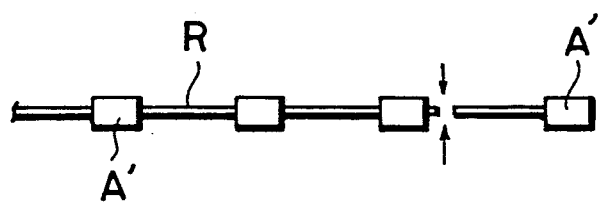
FIG. 3 is a front view showing a wire-cutting step of the process.

The molded compacts A' thus obtained may be separated from each other by cutting the lead wire R at suitable positions thereof, as shown in FIG. 3. In the conventional way, the separated compacts A' are then subjected to subsequent process steps which include sintering, chemical treatment (formation of tantalum oxide layer), negative electrode formation, and etc. These subsequent process steps, which do not constitute the features of the present invention, are already described in connection with the prior art process, and therefore not explained here.

Alternatively, the compacts A' may be subjected to the subsequent process steps without cutting the lead wire R. For example, the compacts A' carried by the non-cut lead wire R may be introduced into a sintering furnace (not shown) and thereafter into a chemical solution bath (not shown). In this case, the efficiency of the overall process is further improved because the compacts can be supplied successively by utilizing the lead wire.

According to the process described above, a plurality of compacts A' are formed simultaneously by a single compacting step, and there is no need to separately place short lead wires into the respective molding recesses 3. Thus, the process efficiency is greatly improved in comparison with the prior art process.

Further, if the lead wire R is continuous and supplied continually, a great number of compacts A' can be successively produced, and the lead wire may be utilized for transferring the compacts. As a result, the process efficiency is additionally improved.

Moreover, according to the process of the invention, the lead wire R penetrates through the respective loads of electrode material A, and the pressing or compacting force is applied transversely to the lead wire. In other words, the compacting force is applied transversely to but equally all around the lead wire R within the respective molding recesses 3. Thus, no buckling of the lead wire occurs during the compacting process step. The inventors have experimentally confirmed that the process of the present invention is applicable even to a thin lead wire having a diameter of about 50 $\mu$m, whereas the prior art process is limited in applicability to lead wires having not less than 180 $\mu$m.

The present invention being thus described, it is obvious that the same may be varied in many ways. For instance, the lead wire R need not be continuous, provided that it has at least a length substantially corresponding to the length of the lead receiving groove 4. Further, the mold 1 may be formed with plural rows of molding recesses and a corresponding number of lead receiving grooves, while the presser member 2 may be formed with corresponding rows of pressing projections. Moreover, the present invention may be applied to produce various types of solid electrolytic capacitors. Such variations are not to be regarded as a departure from the spirit and scope of the present invention, and all such modifications as would be obvious to those skilled in the art are intended to be included within the scope of the following claims.

We claim:

1. A process for producing solid electrolytic capacitors by using a combination of a mold and a presser member, wherein the mold is formed with at least one series of molding recesses, the mold further being formed with a lead receiving groove extending along said at least one series of molding recesses to pass through the respective molding recesses, the depth of the lead receiving groove being smaller than that of each molding recess, the presser member being formed with a series of pressing portions in corresponding relation to said at least one series of molding recesses, the process comprising the steps of:

(a) placing a lead wire in the lead receiving groove, the lead wire having at least a length substantially corresponding to that of the lead receiving groove;
 (b) loading the respective molding recesses with powdered electrode material;
 (c) causing the respective pressing portions to press the powdered material for compacting thereof within the respective molding recesses; and
 (d) removing the resulting compacts of powdered material from the mold together with the lead wire.

2. The process according to claim 1, wherein the lead wire is held slightly above the bottom of the lead receiving groove before the powdered material is compacted.

3. The process according to claim 1, wherein the series of molding recesses and the series of pressing portions are straight, the lead receiving groove being also straight.

4. The process according to claim 3, wherein the lead wire is continuous and supplied continually, the process steps (a) to (d) being repetitively performed with respect to different portions of the lead wire.

5. The process according to claim 1, wherein the pressing portions are integral projections of the presser member.

6. The process according to claim 1, wherein removal of the compacts from the respective molding recesses is performed by lifting up the lead wire from the mold.

7. The process according to claim 6, wherein removal of the compacts from the respective molding recesses is assisted by pusher pins provided in corresponding relation to the molding recesses for pushing out the compacts.

8. The process according to claim 1, wherein the powdered electrode material is tantalum powder.

* * * * *